March 27, 1951 C. O. WALPER Re. 23,350

ANTISPLASH HEEL

Original Filed Jan. 30, 1946

Inventor

CURRY ORA WALPER

By [illegible]

Attorney

Reissued Mar. 27, 1951

Re. 23,350

UNITED STATES PATENT OFFICE 23,350

ANTISPLASH HEEL

Curry Ora Walper, Kitchener, Ontario, Canada

Original No. 2,452,883, dated November 2, 1948, Serial No. 644,373, January 30, 1946. Application for reissue July 26, 1950, Serial No. 176,085

11 Claims. (Cl. 36—70)

Matter enclosed in heavy brackets [ ] appears in the original patent but forms no part of this reissue specification; matter printed in italics indicates the additions made by reissue.

This invention relates to improvements in the heels of footwear wherewith the water attracted to the heel and raised with the heel from wet surfaces is cast from the heel in a direction away from the opposite leg.

This is a continuation in part of Patent No. 2,395,597, February 26, 1946.

Reference is made to my original Patent No. 2,331,062, dated October 5, 1943; my second Patent No. 2,349,216, dated May 16, 1944; and my third Patent No. 2,380,349, dated July 10, 1945.

In the third case and in this application it will be noted that the original tongue has been dispensed with, the inner side wall of the heel and the breast wall thereof converging instead in a sharply defined corner, and there being moreover at the corner a sharply defined water casting point. It has been found that such a point in many instances casts the water in the desired direction away from the opposite leg equally as well as the structure embodying the tongue, and moreover equally as well as the third structure embodying the declivity in the tread directed toward the point.

However, in some styles of walking there appears to be frequently a drop of water which in defiance of gravity remains molecularly attracted to the inner corner of the breast after the principal few drops of water have been cast by the forward jerk of the foot and there appears to linger long enough to acquire sufficiently more moisture to give it the weight to defy in reversal its molecular properties, and then to be cast to the offensive place on the opposite leg. However, that last drop in closely following the other drops of water off the heel does not appear to specifically follow the route of the main quantity (away from the direction of the opposite leg) but rather follows the more natural route of the main quantity to the back of the opposite leg as when ordinary footwear is used and deposits itself in that natural location. Concisely, with the use of my previous or third invention the main quantity of water is directed away from the back of the opposite leg, but the last remaining drop seems to deposit itself thereon, perhaps because of its delayed cast but more likely because in that infinitesimal period it runs back of or up the heel beyond the point. No reasonable method or means has as yet been devised for promoting the inclusion of this last remaining drop with the main quantity, or in other words, to make the molecular attraction of that drop to the principal quantity of precipitated water stronger than the same attraction to the remaining or spread moisture on the heel, so I have devised means of shaping or profiling the heel to either prevent the drop from running back or up or to dissipate or break it down so that it will cling to the heel as spread moisture rather than as a molecular body.

During the forward jerk of the foot between the moment the main quantity of water is cast and the moment when the last drop is cast the latter appears to have a chance to run or follow back on or up the lower inner rim of the heel, and the drop being therefore more or less remote from the pointed corner is probably the reason it is misdirected since the point is essential to the proper direction of the main quantity.

The reason of the separation of the last drop from the main quantity is quite obvious. The main quantity has momentum imparted to it by the impetus of the commencement or jerk incident to the forward movement of the foot whereupon its speed is thought to accelerate. The acceleration causes the main quantity to separate itself from the heel and to break into molecules which ordinarily are deposited on the opposite leg, i. e., when undirected according to my inventions, while the remaining drop whose molecular attraction defies impetus runs or follows back as previously set forth along the lower rim of the heel and is left behind to deposit itself on the opposite leg. Obviously when the water is undirected or improperly directed by leaving the heel elsewhere than at the pointed portion, including the last drop, it is deposited at random and at least part of it on the opposite leg.

This last drop may not of course be deposited on the opposite leg at every step taken by the foot. Indeed if it were to be thus deposited at every step the opposite leg would soon accumulate such an abundance of splatter as to make the wearer indifferent as to whether even the main quantity was or was not properly directed away from the opposite leg. It may therefore be only once in a hundred steps that the last drop is deposited on the opposite leg, but nevertheless it is my aim to provide means to obviate the deposit even occasionally of this last drop, though it even be only once in its occurrence during a venture in wet weather.

The principal object of the invention in this application is to provide means obviating the declivitous surface of the heel tread of the species of the parent application, and also eliminating the lateral flat ledge of that species.

Another important object is to provide a heel of the class described which will be simple, durable, and inexpensive to produce and to purchase.

With the above and other objects in view as will be hereinafter apparent, the invention consists in general of certain novel details of construction and combinations of parts hereinafter fully described, illustrated in the accompanying drawings and specifically claimed.

Figure 1:
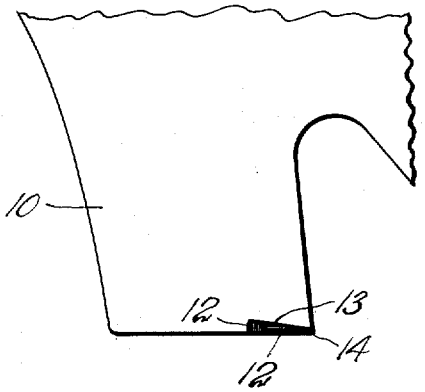
Figure 1 is a side elevation of a heel constructed in accordance with the present invention, the view being the inner side or right hand side of the heel for an article of footwear for wear on the left foot.
Figure 2:
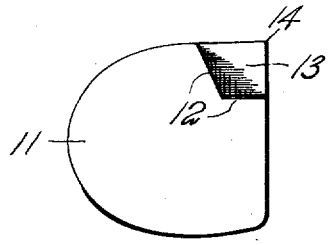
Figure 2 is a bottom view of Figure 1.

As previously set forth the invention consists of means for keeping the last drop of water at the tip or point of the sharply defined corner at the junction of the inner side and the breast portions of the heel during the incalculably small or infinitesimal period intervening from the instant when the principal or main quantity of water is precipitated or cast and the instant when that last drop is cast, or, in other words, preventing that last drop from running or following back on or up the lower inner rim or margin of the heel.

On the drawing a left heel for an article of footwear is indicated by the numeral 10 in all the views, and the tread body or lift by 11.

In the species of the invention illustrated in Figures 1–4 inclusive of the parent application the bottom face or tread surface of the tread body is evenly inclined from the inner forward corner clear across diagonally to the outer rear region. This formation establishes a low inner forward corner which is sharply defined and pointedly tipped in order to direct the water cast during the forward movement in a straight ahead path. The low corner usually keeps the last drop from running back on or up the lower inner rim of the heel, or along the lower rim of the breast, or up in the corner of the breast itself since it would have to rise or run up hill in defiance of gravity which in such an instance is found to defeat molecular attraction as can be readily understood.

In that species of the invention it was found preferable to extend the tread body on its inner side to form a flat surfaced ledge for directing the water flowing down the inner wall portion of the heel to the sharp corner and thence to the tip rather than to depend on it flowing to the rim of the tread and thence to the tip by molecular attraction. In this instance, the extended portion or lip of the tread body and the breast merged in a sharply defined corner.

In its present embodiment, this species consists of a cavity in the inner forward corner of the heel tread body having an acclivitous ceiling up which the last drop will not run.

The said cavity is produced by forming a substantially vertical wall 12 partially across the body from the inner side and back from the breast thereof, thereby forming a ceiling 13 extending from the height of the wall downwardly and forwardly, and terminating at the lower margin of the breast at an acute angle thereto or tip 14, the breast being uninterrupted.

Figure 3:
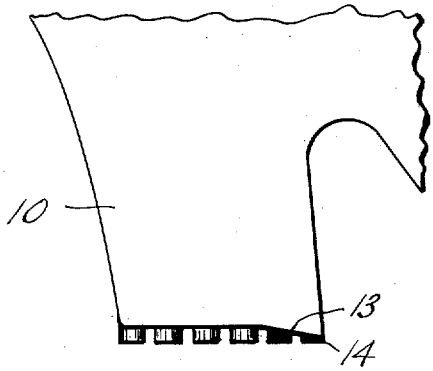
Figure 3 is a side elevation similar to Figure 1 of a modified form of the invention.
Figure 4:
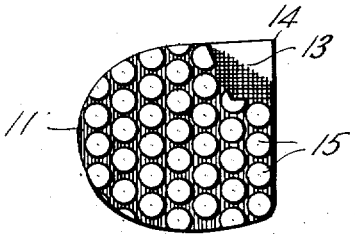
Figure 4 is a bottom view of Figure 3.
Figure 5:
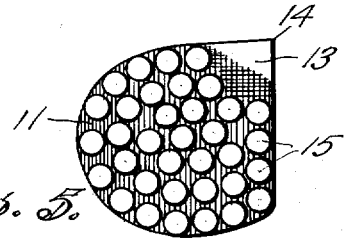
Figure 5 is a slight modification of the structure of Figure 4.

Very often storm footwear is made with the heel tread roughened or cleated, a typical form being a plurality of bosses or studding, this being for the purpose of providing footwear having non-slip or non-skid properties. As an example a typical form of such a tread is shown in Figures 3 and 4, consisting of a plurality of bosses 15. In this form the tip drops to the plane of the surface of the bosses, as clearly seen in Figure 3, and actually the bosses 15, as well as acting as a non-skid heel tread, act to support the tip 14 away from the floor when the footwear is in non-use, to keep the tip 14 from deformation. It can readily be understood that such footwear is at rest or unworn more than it is in use.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

I claim:

1. In a heel for an article of footwear including a tread body, the tread body having a cavity formed in the inner forward corner portion thereof, said cavity being produced by forming a substantially vertical wall partially across the body from the inner side and back from the breast thereof and forming a ceiling extending from the height of the wall downwardly and forwardly and terminating at the lower margin of the breast at an acute angle thereto, the breast being uninterrupted.

2. In a heel for an article of footwear including a tread body having a tread surface, said body having a cavity formed in the inner forward corner portion thereof whereby said corner portion is mainly tread surfaceless, the ceiling of said cavity being tapered downwardly and forwardly and terminated in a pointed tread tip.

3. In a heel for an article of footwear including a tread body consisting of a non-smooth or interstitial tread surface, said body having a cavity formed in the inner forward corner portion whereby said corner portion is mainly tread surfaceless, the ceiling of said cavity being tapered downwardly substantially from the plane of the depth of the interstices and being terminated in a pointed tread tip.

4. In a heel for an article of footwear including a tread body, said body having a cavity formed in the inner forward corner portion thereof, the ceiling of said cavity being tapered downwardly and terminated in a pointed tip lying substantially on the vertical plane of the inner forward corner of said body.

5. In a heel for an article of footwear including a tread body having a tread surface, said body having a cavity formed in the inner forward corner portion thereof and the upper wall of the cavity extending generally downward and terminating as a tip disposed substantially at the said inner forward portion, said tip terminating no lower than the plane of the tread surface.

6. In a heel for an article of footwear including a tread body having a tread surface, said body having a cavity formed in the inner forward corner portion thereof, and the upper wall of the cavity extending generally downwardly and terminating as a tip disposed substantially at the said forward portion, the point of said device lying in close proximity with the corner of the breast and inner side of said body.

7. In a heel for an article of footwear including a main tread surface, said heel having at its forward inner corner a recess, said recess having a substantially vertical wall extending from the breast to the inner side of the heel, and a water ejecting element depending in the recess and terminating at the junction of the breast and inner side of the heel in a pointed terminus, the outer walls of said water ejecting element lying substantially in the planes of the breast and a side of the heel and said water ejecting element being isolated from said vertical wall whereby to provide immunity to water film exchange between said main tread portion and said terminus.

*8. In a heel for an article of footwear including a main tread surface, said heel having at its forward inner corner a cavity, said cavity having a substantially vertical wall extending from a point on the breast side of the heel, near to the junction of the breast side and inner side, to a point, on the inner side of the heel, near to the junction of the inner side and the breast side and a water ejecting element depending in the cavity and terminating at the junction of the breast and inner side of the heel in a pointed terminus, the outer walls of said water ejecting element lying substantially in the planes of the breast and inner side of the heel, and said terminus of the water ejecting element being spaced from the wall whereby to provide immunity to water film exchange between said main tread portion and said terminus.*

*9. In a heel for an article of footwear including a main tread surface, said heel having at its forward inner corner a recess, said recess having a wall extending from a point on the breast side of the heel, near to the junction of the breast side and inner side, to a point, on the inner side of the heel, near to the junction of the inner side and the breast side, said recess having a ceiling extending from the upper limits of said wall to a point on said junction, said ceiling forming a water ejecting element and terminating at the junction of the breast and inner side of the heel in a pointed terminus, the outer walls of said water ejecting element lying substantially in the planes of the breast and inner side of the heel and said terminus being located on a line with the angle between the breast of the heel and the inner side of the heel, and being spaced from said wall.*

*10. In a heel for an article of footwear including a main tread surface, said surface having at its forward inner corner a recess, said recess having a substantially vertical wall extending from a point, on the breast side of the heel, near to the junction of the breast side and inner side, to a point, on the inner side of the heel, near to the junction of the inner side and the breast side, and said wall forming an external corner on the inner side of the heel at the junction of the inner side, wall, and tread surfaces and forming an external corner on the breast side of the heel at the junction of the breast side, wall, and tread surface, and said wall forming an internal corner at the junction of the wall and ceiling of the recess, said ceiling forming a water ejecting element and terminating at the junction of the breast and inner side of the heel in a pointed terminus, the outer walls of said water ejecting element lying substantially in the planes of the breast and inner side of the heel and said terminus being located on a line with the angle between the breast of the heel and the inner side of the heel, and being spaced from said wall.*

*11. In a heel for an article of footwear including a tread body portion having a tread surface, said surface having a cavity at the forward inner corner of said tread surface, said cavity having a wall extending from the breast of the body portion to the side of the body portion whereby an external corner is formed at the breast, near to the junction of the breast and the side of the body portion at the union of the tread surface, wall and breast, and whereby an external corner is formed at the side, near to the junction of the side and the breast of the body portion at the union of the tread surface, wall and side, said cavity having a ceiling extending from the upper limits of said wall to said junction, said ceiling forming a water casting element and terminating at said junction in a tapered terminus, the outer walls of said water casting element lying substantially in the planes of the breast and the side of the body portion, and said terminus being located on a line with the angle between the breast of the body portion and the side of the body portion, and being spaced from said wall.*

CURRY ORA WALPER.

REFERENCES CITED

The following references are of record in the file of this patent or the original patent:

UNITED STATES PATENTS

| Number | Name | Date |
|---|---|---|
| 2,157,184 | Neumann | May 9, 1939 |

FOREIGN PATENTS

| Number | Country | Date |
|---|---|---|
| 308,939 | Great Britain | Apr. 4, 1929 |